United States Patent [19]

Sato

[11] Patent Number: 4,919,420
[45] Date of Patent: Apr. 24, 1990

[54] GRIP OF A GOLF CLUB AND A MANUFACTURING METHOD THEREOF

[75] Inventor: Koji Sato, Tokyo, Japan

[73] Assignee: Daiwa Golf Co., Ltd., Tokyo, Japan

[21] Appl. No.: 235,992

[22] Filed: Aug. 24, 1988

[30] Foreign Application Priority Data

Aug. 28, 1987 [JP] Japan .................................. 62-132076
Aug. 29, 1987 [JP] Japan .................................. 62-15838

[51] Int. Cl.$^5$ ........................ A63B 53/14; B32B 31/00
[52] U.S. Cl. ................................. 273/81 B; 273/81.4;
16/DIG. 19; 264/139; 156/154; 156/162; 156/257
[58] Field of Search ................. 273/81 R, 81 B, 81 D, 273/165, 81.4, 81.5, 81.6, 67 DA, 67 DB, 73 J, 75, 72 R, 68, 67 R, 73 C, 73 F, DIG. 7, DIG. 23; 16/110 R, DIG. 12, DIG. 19; 81/489, 177.1; 74/558.5, 551.9; 156/154; 264/139, 162, 257, 248, DIG. 64

[56] References Cited

U.S. PATENT DOCUMENTS

| D. 173,110 | 9/1954 | Karns .......................... 273/81 R X |
| 2,115,119 | 4/1938 | Park .................................. 273/81 R |
| 2,382,248 | 8/1945 | Mason ............................... 264/139 |
| 2,663,663 | 12/1953 | Weltman et al. .................. 264/139 |
| 4,308,762 | 1/1982 | Jannard ............................ 16/110 R |

FOREIGN PATENT DOCUMENTS

| 451133 | of 1948 | Canada ........................... 273/81 R |
| 2573988 | of 1986 | France ............................. 273/75 |
| 51-49174 | 4/1976 | Japan . |

Primary Examiner—Edward M. Coven
Assistant Examiner—Sebastiano Passaniti
Attorney, Agent, or Firm—Kalish & Gilster

[57] ABSTRACT

A grip of a golf club according to the present invention prevents slipping, when the grip is grasped by a hand opposite to a whip hand, by applying an area having a plurality of projections to the area of the grip corresponding to the respective bases of the middle finger, the ring finger and the little finger of the palm of the hand opposite to said whip hand and to the palm located on the extension of the neighborhood of the base of the little finger of said palm. Also, since there is an area where a plurality of projections or dents are formed being separated independently one by one. Accordingly, when the whole of the element body of the grip is ground from the surface in a uniform depth, the fiber is exposed in the area having a plurality of plane portions and the fiber is not exposed in the area having a plurality of jogs. In this area where the fiber is exposed, a moderate non-slip effect is obtainable and soft grip feeling is presented.

2 Claims, 10 Drawing Sheets

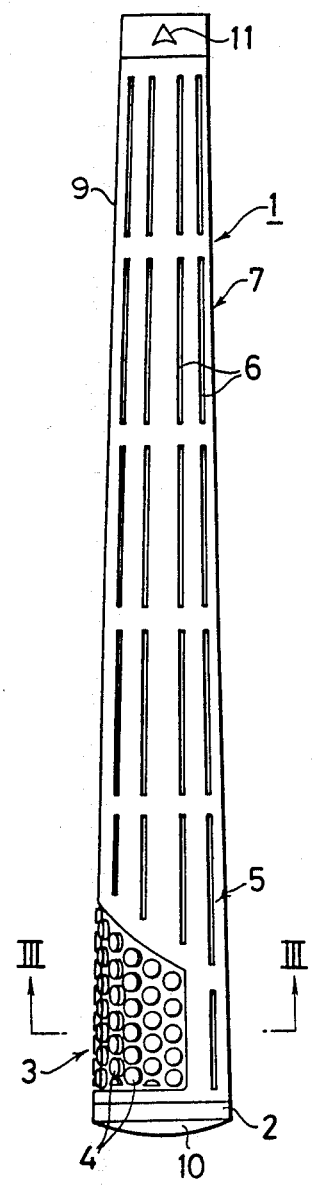
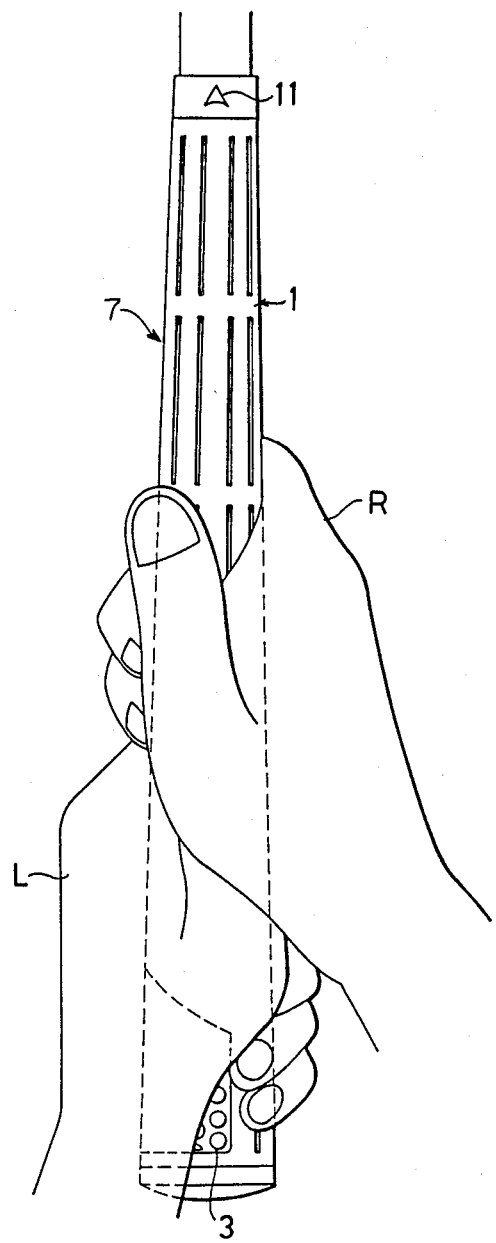

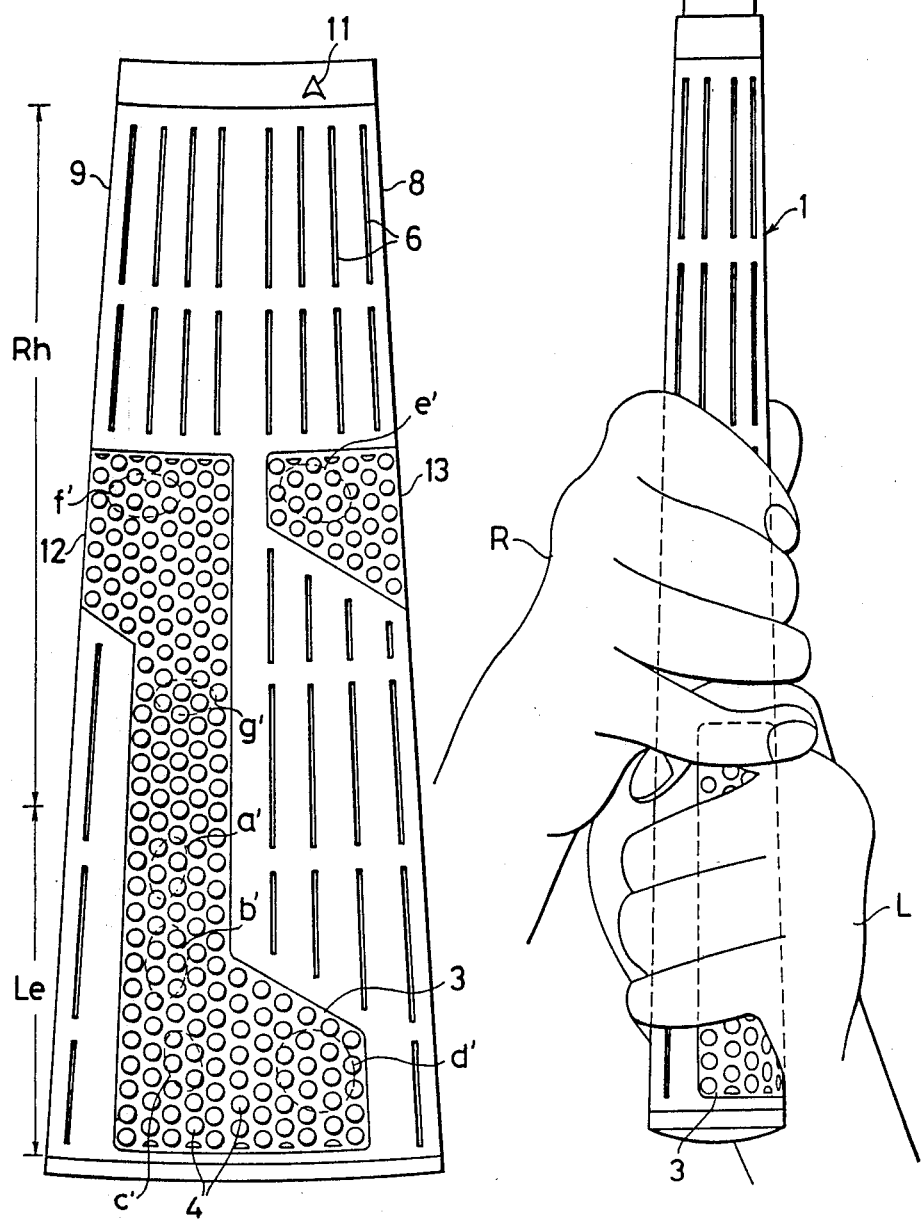

FIG.21
FIG.22
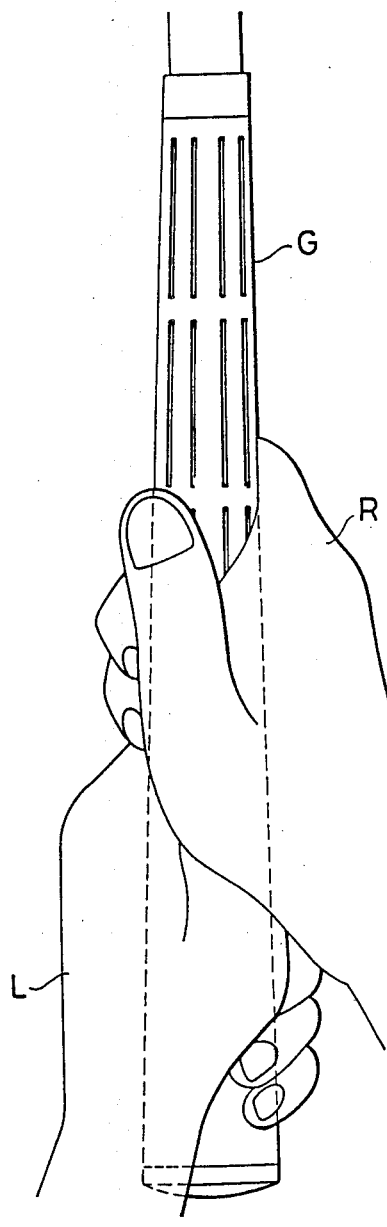
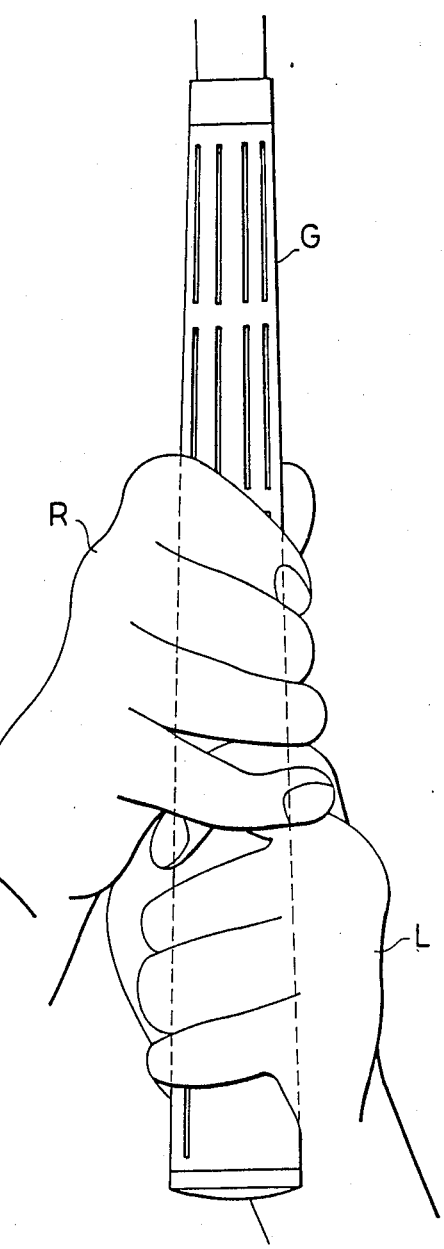

GRIP OF A GOLF CLUB AND A MANUFACTURING METHOD THEREOF

The present invention relates to an improvement of a grip of a golf club. It also relates to a grip of a golf club on the surface of which a fiber is exposed and a manufacturing method thereof.

In recent years, a grip which checks slip and gives a pleasant grip feeling is being popularized, but is not sufficient to meet the situation as yet.

In short, when the case of a right-handed player is explained concerning gripping, as shown in FIG. 21 and FIG. 22, the right-handed player generally grasps a grip G by the left hand L in a stronger manner than the right hand R holding it so that the grip G does not turn round or come off, and on the other hand, the right hand R is put on the left hand L so as to make it possible to control a gold club head (not shown). That is, since the grasping power by the left hand L is stronger than that of the right hand R, the left hand L particularly rotates in the circumferential direction of the grip G and slips out easily in the axial direction, thus hindering the play if nonslip is not effected sufficiently.

Therefore, a grip having projections and dents on a grip surface such as disclosed in Utility Model Provisional Publication No. 117651/76, Utility Model Provisional Publication No. 120159/78, Utility Model Provisional Publication No. 157376/82, or a grip provided with ditches or grooves on the grip surface such as disclosed in Utility Model Provisional Publication No. 15575/85, Utility Model Provisional Publication No. 2617/83, has been heretofore proposed.

In the former type, however, projections and dents are provided circumferentially over the entire grip surface. Thus, the whole of the palm and bulbs of the player's fingers touch the projections inhibiting a dents and pleasant, soft feeling. Accordingly, after extended play, the bulbs of fingers often become sore.

In the latter grip type, non-slip material is applied to the golf club grip substantially at the areas which will touch the bases of player's fingers, in the circumferential direction, but the grip cannot be prevented from coming off because a plurality of paralel ditches are arranged in an axial direction. Moreover, since there are a variety of gripping methods used, such as natural grip, square grip, strong grip, base grip and weak grip, the direction of ditches does not necessarily accord with the hand and fingers of the player, thus patent rating insufficient non-slip actioin. Furthermore, as to a grip of a golf club on the surface of which a fiber is exposed, for example, three types have been heretofore known, as follows.

(1) A fabric with rough texture is buried inside of a rubber layer of the main substance of a rubber grip in a hollow cylindrical form along the outer surface thereof, of, and a part of the outer surface of the grip main substance is cut in a longitudinal direction thereon, to expose the fiber of said fabric at the part. (Utility Model Official Gazette No. 46115/76).

(2) In a grip in which a sandwiched plate is formed by putting non-slip cords woven in a rattan blind form having warps in fine texture and wefts in rough texture between rubber plates, a grip is formed by vulcinazation molding of said plate with a grip die, and the rubber on the grip surface is scraped off so as to expose the non-slip cords beneath the surface. The non-slip cords are applied only to the surface of an appropriate portion of the grip. (Utility Model Provisional Publication No. 49174/76)

(3) In a rubber grip having such a structure that an end portion on the outermost and, having a large diameter, of a rubber cylinder having different diameters at the opposite ends thereof is blocked with a grip head. A tire cord layer in a longitudinal direction up to nearly intermediate location in the longitudinal direction of the rubber grip running from the grip head end to the opposite. (Utility Model Official Gazette No. 44525/78).

All of above mentioned types may be applied to a simple design pattern, however, in case of a complicated pattern, the dents become complicated to meet the complicated design and grip feeling is deteriorated when cutting is done according to the device (1). Therefore, there is a drastic restriction in point of design. In embodiments according to devices (2) and (3), a pattern in which the cords are exposed on the half of the grip surface is adopted, which is simple. However, in order to apply a complicated design pattern by such methods, fiber cloth has to be cut exactly to the pattern, and the cut fiber has to be adapted to a predetermined position of the rubber plate, which is not only troublesome in operations, but also positions of cord areas are scattered and the quality cannot be maintained stable.

In other words, it has been difficult to obtain a complicated pattern in the area where the cord (fiber) is exposed in accordance with grip functions and ways of gripping by hand by abovementioned conventional systems.

Accordingly, it is an object of the present invention to provide a grip of a golf club which gives a pleasant grip feeling, secures non-slip, and causes no pain on the hand and bulbs of fingers.

It is another object of the present invention to provide a grip of a golf club which makes it possible to expose the fiber in accordance with variety of design patterns and a manufacturing method thereof.

In a grip of a golf club according to the present invention, there is provided an area having a plurality of jogs which, when the grip is grasped by the hand opposite to the whip hand in the neighbourhood of the respective bases of the middle finger, the ring finger and the little finger, and on the extension of the hand palm the little finger and near the little finger itself, and an area having a plurality of plane portions at a region where fingers and the palm other than the above of the hand opposite to the whip hand abuts against the grip.

According to the present invention, when the grip is grasped by hand opposite to the whip hand, the neighbourhood of the middle finger, the ring finger and the little finger of the palm of the hand opposite to said whip hand and the palm located on the extension of the neighbourhood of the base of the little finger and the little finger abuts against individual jogs in the area having a plurality of jogs. In particular, slipping is prevented by the palm being caught by the edges of individual jogs.

Also, the fingers and the palm other than the above of the hand opposite to the whip hand abut against the area having more soft plane portions than the area having a plurality of jogs, thus giving a soft feeling to the player and causing no pain to the palm and bulbs of fingers.

Moreover, the grip of a golf club according to the present invention is formed in such a manner that in a grip of a golf club wherein a fiber layer is buried in a raw material for grip such as rubber or soft synthetic resin and the fiber is exposed on the surface by grinding from the surface side, an area having a plurality of jogs and an area where the fiber is exposed are formed on the grip surface.

Furthermore, according to a manufacturing method of a grip of a golf club of the present invention, such grip having an outer surface; and being formed by selecting a raw material a fiber layer inserted between two sheets or plates composed of rubber or soft synthetic resin, etc. said fiber layer having a substantially the same size as said plates, placing said plates having said fiber layer therebetween in a grip forming mold and compressing while heating in the grip forming mold, thereby to form a grip element body provided with an area having a plurality of continuous projections and farther provided with an area having a plurality of plane portions, and then uniformly grinding the whole surface of this grip element body only until the fiber in the area having a plurality of plane portions is exposed.

According to the present invention, there is an area where a plurality of either projections or dents are formed, being separated independently one by one. Therefore, in case of a projection, the fiber layer is buried further inside of the bottom portion of a dent before grinding, and in case of a projection, the fiber layer is buried further inside of the bottom portion of grooves running lengthwise and crosswise between respective projections.

That is, there is no such phenonmenon in the area having a plurality of plane portions, and the fiber layer is buried at a shallower position than the grip surface.

Accordingly, when the whole of this element body for grip is ground in an even depth from the surface, the fiber is exposed in the area having a plurality of plane portions and the fiber is not exposed in the area having a plurality of jogs.

BRIEF DESCRIPTION OF THE DRAWINGS

FIG. 4 is a front view showing a grip according to abovesaid embodiment;

FIG. 5 is a front view showing the use condition thereof;

FIG. 6 is a rear view showing said use condition;

FIG. 7 is a development showing another embodiment of the present invention;

FIG. 21 is a front view showing the use condition using a conventional grip; and FIG. 22 is a rear view showing said use condition.

DESCRIPTION OF PRACTICAL EMBODIMENTS

Embodiments of the present invention will be described hereafter with reference to the accompanying drawings.

Figure 1:
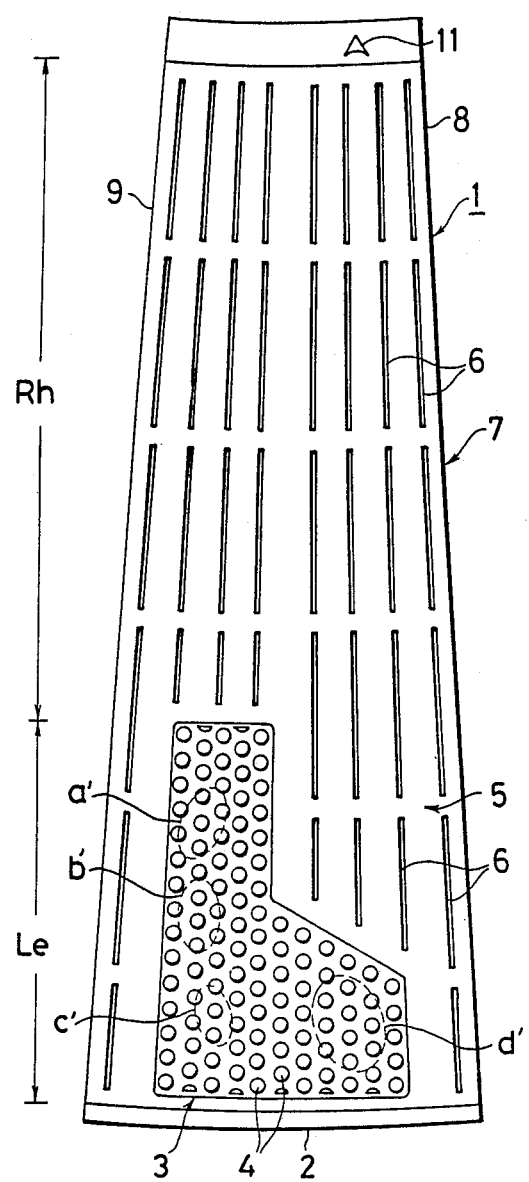
FIG. 1 is a development showing an embodiment according to the present invention.

FIG. 1 is a development of a grip of a golf club according to the present invention. In the Figure, a reference numeral 1 denotes a grip for a right-hander.

This grip 1 is composed of, for example, rubber or soft synthetic resin, and includes an area 3 having projections 4 that stand close together on the side of a grip end 2 so as to form almost an L-shape is provided. These projections 4 are separated independently one by one, and in particular, projections 4 in the present embodiment are circular cylinders in shape. Thus, these projections 4 are formed integrally with the grip 1 so that the palm is engaged with the edges of projections 4 one by one corresponding to the slip in all directions n 360°, and projections 4 are inclined further and abut against the upper surface and one side surface of the palm thereby to prevent the slip.

Figure 2:
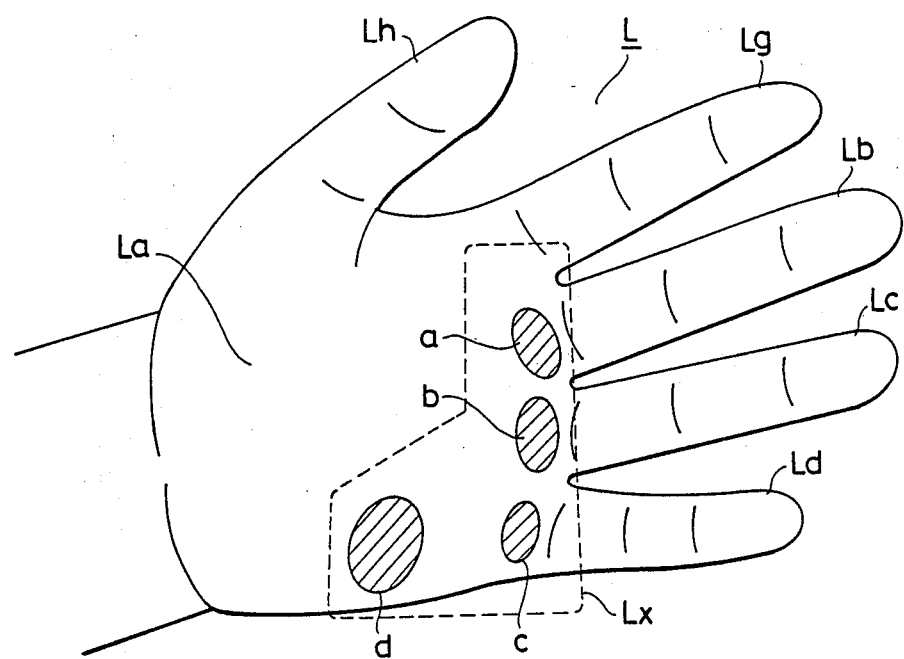
FIG. 2 is an explanatory view showing the position having a corn on the left thand of a player.

As shown in FIG. 2, area 3 is generally the position to have a corn in the palm La of the left hand (the hand opposite to a whip hand) L of a player. The area 3 is to have an area Lz; including the neighbourhood of the base a of the middle finger Lb, the neighbourhood of the base b of the ring finger Lc, the neighbourhood of the base c of the little finger Ld in the palm La, and the tubercle d located interior of the base of the little finger Ld and the little finger Ld on the palm La which area abuts against projections 4.

Accordingly, a' in said area 3 shown in FIG. 1 shows a region which the neighbourhood of the base a of the middle finger Lb abuts against, b' shows a region which the neighbourhood of the base b of the ring finger Lc abuts against, c' shows a region which the neighbourhood of the base c of the little finger Ld abuts against, and d' shows a region which the tubercle d located on the extension of the neighbourhood of the base c of the little finger Ld and the little finger Ld abuts against.

Figure 3:
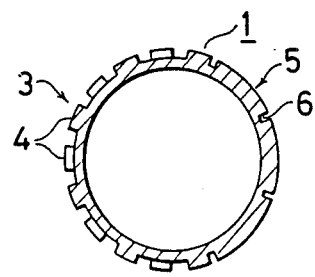
FIG. 3 is a cross-sectional view taken along the line III-III shown in FIG. 4.

Further, as shown in FIG. 1 and FIG. 3, there is provided an area 5 having a plurality of plane portions provided appropriately with ditches 6 for instance at locations other than the area 3 in a scope Le grasped by the left hand L.

Bulbs of the middle finger Lb, the ring finger Lc and the little finger Ld of the left hand L principally abut against this area 5.

Also, in a scope Rh grasped by the right hand R closer to the club head than the scope Le grasped by the left hand L, there is provided an area 7 having a plurality of plane portions provided appropriately with ditches 6 for instance in a similar manner as said area 5.

An identification mark 11 is provided at a front central portion on the end of grip 1 near the club head (not shown).

Next, operations and effects of this embodiment thus composed will be explained.

As shown in FIG. 4, both end portions 8 and 9 are connected by hackneyed means, and a seal member 10 is attached to the grip end 2, thus forming the grip 1 in a cylindrical form.

Then, this grip 1 is held by the left hand L and the right hand R as shown in FIG. 5 and FIG. 6 for instance in a way as described hereunder. First, as shown in FIG. 2, regions a, b, c and d where a core is liable to be produced in the left hand L are made to abut against regions a', b' and d' of the grip 1 in the corresponding area 3, bulbs of remaining fingers Lb, Lc and Ld are made to abut against the adjacent regions 5, and the forefinger Lg and the tumb Lh are further made to abut against areas 5 and 7, respectively thus holding the grip tightly. Then, by attaching the right hand R to the left hand L, the area 7 is grasped by most of the fingers.

When the grip 1 is grasped in this manner by both hands L and R, regions a, b, c and d where a core is liable to be produced contact any of projections 4 standing close together at corresponding regions a', b', c' and d' in the area 3, and at this time, respective contacting projections 4 prevent said regions a, b, c and d from slipping in all directions in 360°.

Accordingly, the grip 1 will never turn round or come off at the abutting position of the left hand L in the area 3.

Furthermore, since remaining fingers Lb, Lc and Ld of the left hand L abut against the area 5 where grip feeling takes precedence over non-slip, the bulbs of fingers will never hurt.

Also, since the right hand R abuts against soft areas 5 and 7 in the similar manner as an ordinary grip, pleasant grip feeling is obtainable and the palm and the bulbs of fingers will never hurt. In a word, the left hand being the main constituent for non-slip, the scope Rn grasped by the left hand L may be an area having a plurality of plane portions as shown in FIG. 1 thru FIG. 6.

FIG. 7 shows another embodiment according to the present invention, wherein there are provided areas 12 and 13 where a corn is liable to be produced on the right hand R in addition to the area 3 where a corn is liable to be produced on the left hand L.

Figure 8:
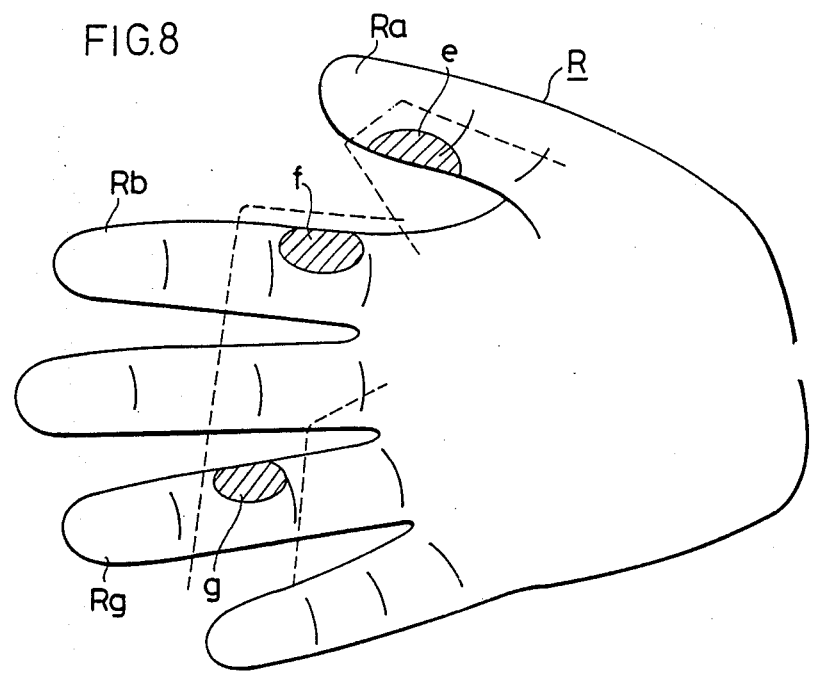
FIG. 8 is an explanatory view showing the position of a corn produced on the right hand of the player.
Figure 9:
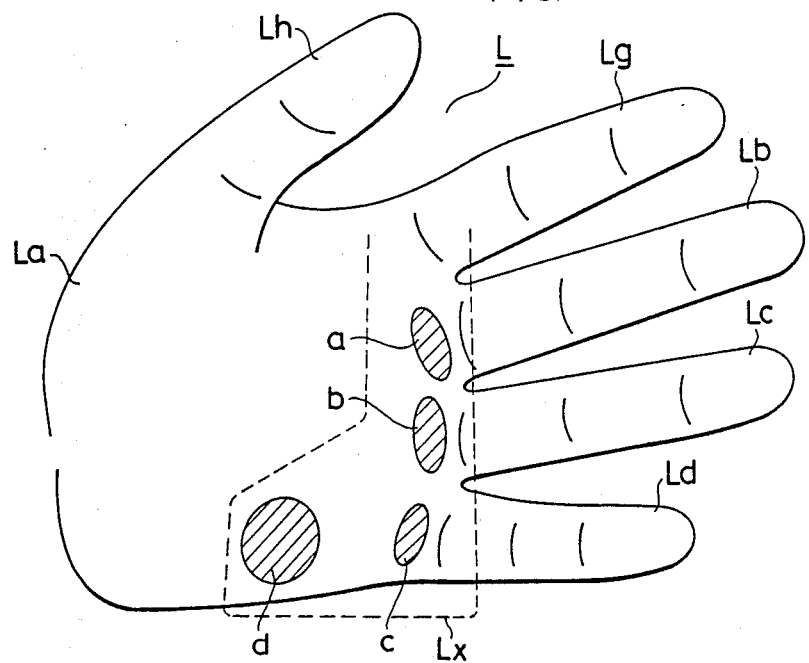
FIG. 9 is an explanatory view showing the position of a corn produced on the left hand of the player.

On the right hand R, a corn is liable to be produced in general on a side surface e of the first joint of the thumb Ra, a side surface f between the second joint and the third joint of the forefinger Rb and a side surface g between the first joint and the second joint of the ring finger Rg as shown in FIG. 8.

Therefore, in this embodiment, (FIG. 7) an area 12 provided with a region f' which abuts against the side surface f between the second joint and the third joint of the thumb Rb and region g' which abuts against the side surface g between the first joint and the second joint of the ring finger Rg is formed in the scope Rh grasped by the right hand R continuously to the area 3 where a corn is liable to be produced on the left hand L, and a region 13 provided with a region e' which abuts against the side surface e of the first joint of the thumb Ra is formed adjacent thereto.

With this, operations and effects similar to aforesaid embodiment are obtainable in the region which abuts against the left hand L, and any of projections 4 standing close together in areas 12 and 13 is contacted in respective abutting regions e, f and g on the right hand R, when those contacting projections 4 make said regions, e, f and g non-slipping in all the directions in 360°.

Accordingly, this is a preferred grip for a beginner player or a female player who has a weak grasping force of the grip 1 by the left hand L.

Figure 10:
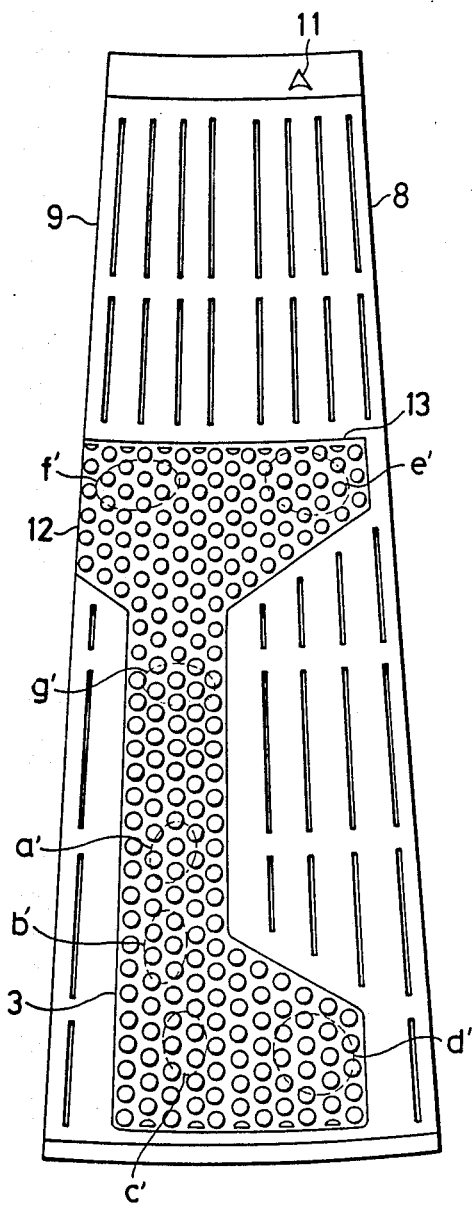
FIG. 10 is a development showing still another embodiment of the present invention.
Figure 11:
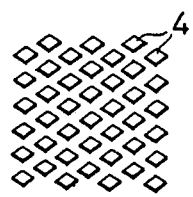
FIG. 11 and FIG. 12 are explanatory views showing examples of the projection.

FIG. 10 shows an embodiment wherein areas 12 and 13 in FIG. 7 are connected.

In this embodiment, operations and effects similar to FIG. 7 are obtainable, too.

Figure 12:
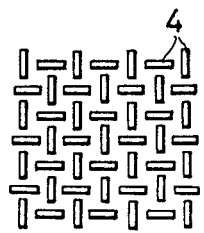

Besides, as to projections 4 having no orientation, the present invention is not limited to a cylindrical projections in abovedescribed embodiments, but prismatic projections such as shown in FIG. 1 may be adopted. The arranging method may also be such that prismatic projections are arranged in different directions as shown in FIG. 12 for instance.

Furthermore, it may also be arranged in such a manner that, for example, the projection is formed in a dent in a dimple form by reversing the relation between the projections and grooves (produced between projections) shown in abovesaid embodiments.

Also, a right-handed player is described in abovementioned embodiments, but in case of a left-handed player, the same effects are obtainable by providing an area which the region where a corn is produced on the right hand is made to abut against.

As described above, according to the present invention, there are provided an area having a plurality of jogs which touches the hand when the grip is grasped by hand opposite to the whip hand in the neightbourhood of respective bases of the middle finger, the ring finger and the little finger of the palm of the hand opposite to the whip hand, and on the palm positioned on the extension of the neighbourhood of the base of the little finger and the little finger of said palm, and an area having a plurality of plane portions at a region where fingers and the palm other than the above of the hand opposite to the whip hand abuts against the grip. Therefore, slipping in all directions including circumferential and axial directions may be prevented. Also, the non-slip effect will never be reduced for players whose grip grasping directions are different. In particular, the bulbs of fingers seldom touch the surface having a plurality of projections and contact the surface having a plurality of plane surfaces, thus giving a soft feeling.

Figure 13:
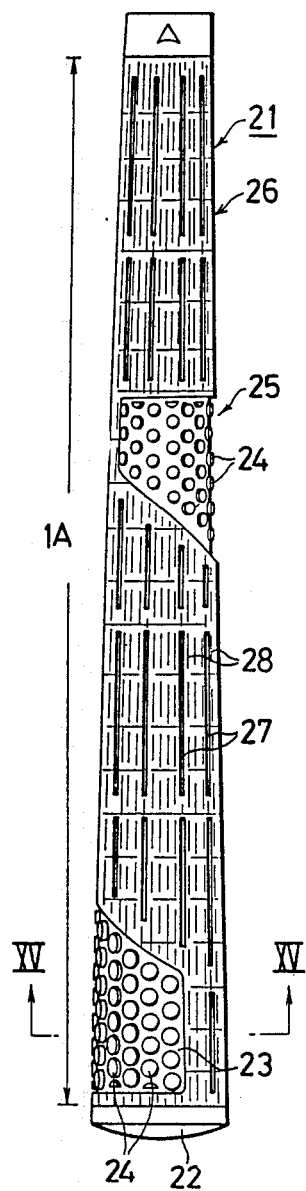
FIG. 13 is a front view showing an embodiment of a grip according to the present invention.
Figure 14:
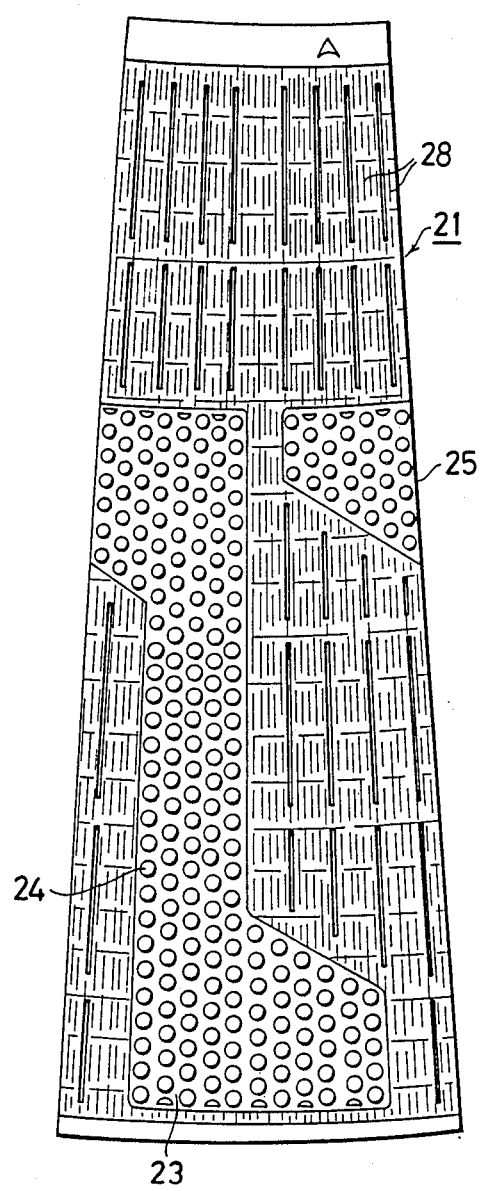
FIG. 14 is a development thereof.
Figure 15:
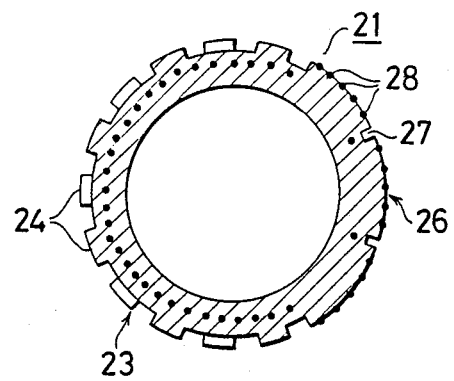
FIG. 15 is a cross-sectional view taken along the line XV-XV shown in FIG. 14.

FIG. 13 thru FIG. 15 show grips of golf clubs according to the present embodiment. In these Figures, a reference numeral 21 denotes a grip for the whip hand.

This grip 21 is composed of, for example, rubber or soft synthetic resin, etc. and provided with an area 23 where small protections 24 are made to stand close together so as to form almost a crank form from the side of the grip end 22 toward the point, and a trapezoidal area 25 where small projections 24 connecting with this area 23 are made to stand close together. These small projections 24 are separated independently one by one, and formed integrally with the grip 21. Almost no fiber 28 is exposed on respective small projections 24, being different from an area 26 having a plurality of plane portions which will be described later.

The portion except these areas 23 and 25 is constituted by the area 26 having a plurality of plane portions provided with ditches 27 in a predetermined length in the axial direction at predetermined intervals. In this area 26 having a plurality of plane portions, the fiber 28 is exposed as shown in FIG. 15.

According to the grip 21 thus structured in the present embodiment, in areas 23 and 25 where small projections 24 are provided, regions abutting when the grip 21 is grasped make contact with respective small projections 24 individually. With this, small projections 24 check movement of regions making contact corresponding to all directions in 360° so as to prevent slipping. Further, in the remaining regions, it is arranged so as to avoid heedless slipping caused by excessive friction applied to hand, fingers and palm by the fiber 28 which is exposed to the surface.

In other words, the areas 23 and 25 having a big non-slip effect and the area 26 including a plurality of plane portions having little non-slip effect by exposing the fiber 28 are formed integrally in this embodiment. Therefore, it is possible to form the areas 23 and 25 at portions where a corn is liable to be produced on the palm and fingers of the player and tight gripping is required, and to obtain softer grip feeling than the areas 23 and 25 at other portions. Furthermore, the area where the fiber is exposed and the area where the fiber is not exposed are partitioned off by areas 23, 25 and 28, thus obtaining a grip of rich design characteristic. It is also possible to design corresponding to different grip grasping methods such as natural grip, square grip, strong grip, base grip and weak grip, etc.

In the next place, an example of a manufacturing method of the grip 21 according to the present embodiment thus composed will be explained in due order.

Figure 16:
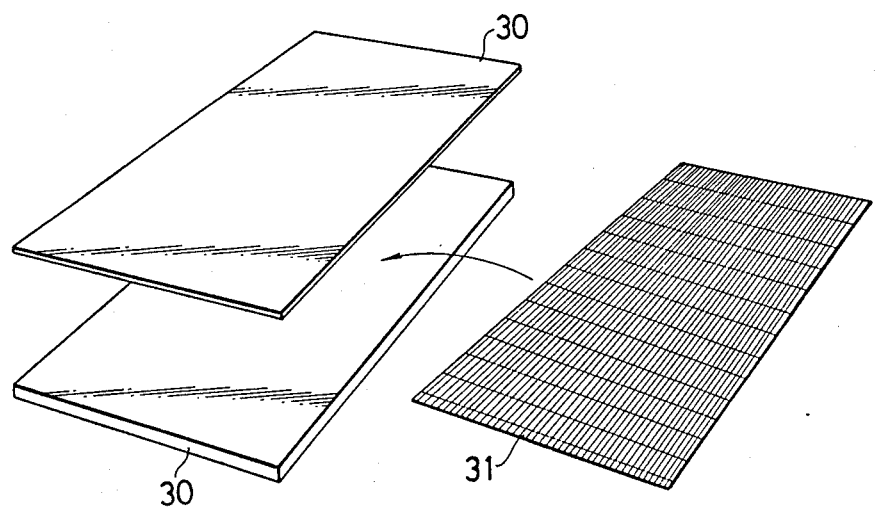
FIG. 16 is an exploded explanatory view showing a raw material for grip used in an embodiment of a manufacturing method according to the present invention.

First, as shown in FIG. 16, two sheets or plates 30, 30 composed of rubber or soft synthetic resin, etc. are prepared, and a raw material 32 in which a fiber layer (fiber cloth using nylon or cotton was used in this example) 31 having almost the same size as these plates 30, 30 is sandwiched therebetween is manufactured.

Figure 17:
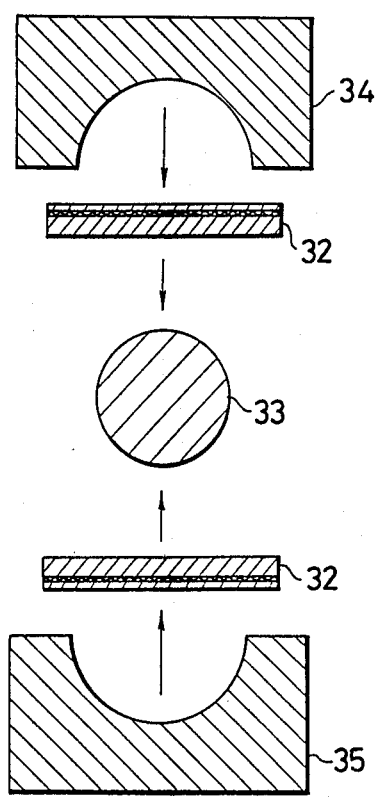
FIG. 17 is a schematic view showing a molding state in a manufacturing method according to the present invention.

Next, as shown in FIG. 17, two sheets of raw materials 32, such as rubber, are put on the upper side and the lower side of a core mold 33 having a form of the grip 21, and compression with heating is performed from top and bottom with molds 34 and 35 applied with a design pattern as shown in FIG. 14.

Figure 18:
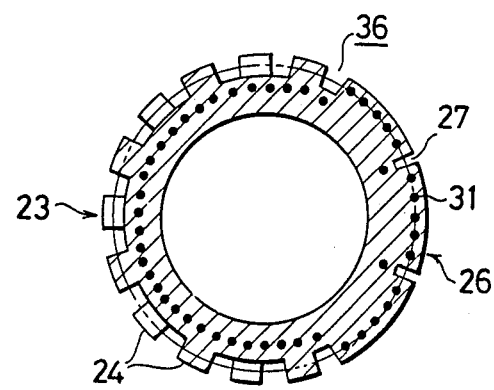
FIG. 18 is a cross-sectional view showing a grip element body after molding in the manufacturing method.

By means of such compression with heating, two sheets of materials 32 for grip 1 are press fitted to the core mold 33, and thus, as shown in FIG. 18, an element body 36 for grip including the areas 23 and 25 with small projections 24 standing close together on the outer surface thereof and the area 26 having a plurality of plane portions is completed.

Next, a grinding processing is applied using a well-known grinder to the gri surface 21A of this element body 36 for grip. In this case, grinding is applied to the whole surface to obtain almost a uniform thickness until the fiber 28 in the element body 32 for grip is exposed.

In the area 26 having a plurality of plane portions, a fiber layer 31 covered by the plate 30 in the raw material 32 for grip is napped only as shown with a mark 28 in FIG. 15 by means of this grinding processing and will never be scraped off.

As compared with this, in the areas 23 and 25 where small projections 24 are provided, these small projections 24 form a small projection group, being independent by separation one by one, and grooves running lengthwise and crosswise between respective small projections 24 are formed in this small projections group. Thus, as shown with a two-dot chain line in FIG. 18, the fiber layer 31 is buried further inside of the bottom portions of grooves running lengthwise and crosswise between respective small projections 24 before grinding.

That is, in the area 26 having a plurality of plane portion, there is almost no phenomenon described above, and the fiber layer 31 is buried at a position shallower than the grip surface.

Accordingly, when the whole of this grip element body 36 is ground from the surface thereof in a uniform depth, the fiber 28 is exposed on the area 26 having a plurality of plane portions, and the fiber 28 is not exposed in areas 23 and 25 provided with a plurality of small projections 24.

As the result, as shown in FIG. 15 for instance, the fiber layer 31 scarcely remains on small projections 24 in the area 23 (25) provided with the small projections 24, and the fiber layer 31 is exposed on the area 26 having a plurality of plane portions.

With this, it is feasible to provide the grip 21 of a design pattern having areas 23 and 25 in special forms provided with small projections 24 on which the fiber 28 is scarcely exposed and the area 26 having a plurality of plane portions where the fiber 28 is exposed.

In above described manufacturing method, since grinding processingmay be applied under a round state as shown in FIG. 18, grinding work may be performed easily.

Besides, it is also possible to proceed with manufacturing under a developed state as shown in FIG. 14, and form into a grip contour by means of after-treatment.

Figure 19:
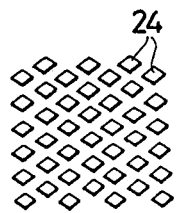
FIG. 19 and FIG. 20 are explanatory views showing examples of a small projection.
Figure 20:
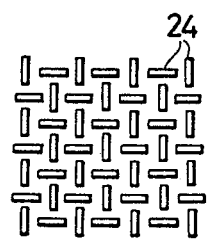

Also, the design pattern of the small projections 24 may be altered suitably and is not limited to a pattern shown. Furthermore, the contour is not limited to the one shown, but may be formed in a contour shown in FIG. 19 or FIG. 20 for instance. Further, a dent such as a dimple may be adopted instead of a projection.

Furthermore, a grip for a whip hand has been described in abovementioned description, however, it is a matter of course that this invention may be applied for a left-hander.

As described above, according to the present invention, fiber exposed regions having a moderate non-slip effect and a soft grip feeling and jog; or projection formed regions having a non-slip effect and making it possible to grasp tightly are mixed, thus making grasping of the grip secure.

Also, since a plurality of jogs are arranged in predetermined locations, it is possible to have the fiber exposed in the area having a plurality of plane portions by means of grinding. Accordingly, even in case of a complicated design pattern, it is possible to form regions where the fiber is exposed and regions where the fiber is not exposed while keeping the grip under a round shape without deforming regions that demonstrate the primary function of the grip.

What is claimed is:

1. A manufacturing method of a grip of a golf club, such grip having an outer surface, and being formed by selecting a raw material from the class consisting of rubber, and soft-synthetic resin substances, inserting a fiber layer between two sheets or plates of said raw material, said fiber layer having substantially the same size as said plates, placing said plates having said fiber layer therebetween in a grip forming mold and compressing while heating in the grip forming mold, thereby to form a grip element body provided with an area having a plurality of continuous projections and further provided with an area having a plurality of plane portions, and then uniformly grinding the whole surface of this grip element body only until the fiber in the area having a plurality of plane portions is exposed.

2. A golf club grip having an outer surface and characterized by being provided with an area having a plurality of projections which touch the grip grasping hand in the palm area of the respective bases of the middle finger, the ring finger and the little finger, and inwardly of the base of the little finger, and an area having a plurality of plane portions in the area where the fingers of the whip hand abut the grip, said grip being comprised of a soft synthetic material, having a fiber layer buried therein, said plane area and said area having a plurality of projections being reduced in some areas by uniformly grinding the whole outer surface of said grip to partially expose said fiber layer for comfort to the whip hand.

* * * * *